United States Patent [19]

Corso

[11] 4,400,317

[45] Aug. 23, 1983

[54] METHOD OF FORMING COPPER COMPLEXES OF AZO-DYESTUFFS USING NON-SALT-FORMING COPPER (II) COMPOUNDS

[75] Inventor: Anthony J. Corso, Coventry, R.I.

[73] Assignee: American Hoechst Corporation, Somerville, N.J.

[21] Appl. No.: 281,635

[22] Filed: Jul. 9, 1981

[51] Int. Cl.³ .................. C09B 45/08; C09B 45/18; C09B 45/28

[52] U.S. Cl. .................. 260/151; 260/145 R; 260/145 C; 260/146 R; 260/147; 260/148; 260/149; 260/150; 260/208

[58] Field of Search ............ 260/146 R, 147, 148, 260/149, 150, 151, 145 R, 145 C; 8/624, 685, 686

[56] References Cited

U.S. PATENT DOCUMENTS

| | | | |
|---|---|---|---|
| 1,216,760 | 2/1917 | Wuth et al. | 260/151 |
| 1,624,637 | 4/1927 | Straub et al. | 260/150 |
| 1,957,580 | 5/1934 | Delfs et al. | 260/150 X |
| 2,938,896 | 5/1960 | Strobel et al. | 260/151 |
| 3,135,730 | 6/1964 | Heyna et al. | 260/147 |
| 4,191,703 | 3/1980 | Steuernagel et al. | 260/151 X |

FOREIGN PATENT DOCUMENTS 297687  12/1929  United Kingdom ............ 260/151

OTHER PUBLICATIONS

Back et al., Chem. Abstracts 89:112324c, (1978).
Jaeger, Chem. Abstracts 89:131048g, (1978).
Gmaj et al., Chem. Abstracts 90:139053w, (1979).
Marek et al., Chem. Abstracts 91:159030k and 159031m, (1979).

*Primary Examiner*—Floyd D. Higel
*Attorney, Agent, or Firm*—Stephan P. Williams

[57] ABSTRACT

A method of directly producing copperized azo-dyestuffs of predetermined inorganic salt content is disclosed wherein an ortho, ortho'-dihydroxyazo-dyestuff is reacted with about one molar equivalent of a copper (II) compound consisting of from 1.0 to 0.1 molar equivalent of a non-salt-forming copper compound selected from $CuCO_3.Cu(OH)_2$, $2CuCO_3.Cu(OH)_2$, $Cu(OH)_2$, $CuO$ and mixtures thereof, and correspondingly from 0 to 0.9 molar equivalent of a salt-forming copper (II) compound selected from $CuSO_4$, $CuCl_2$ and $Cu(NO_3)_2$. The disclosed method provides standard strength copperized dyestuff compositions at increased yields and without the need to precipitate the product from the reaction solution.

4 Claims, No Drawings

METHOD OF FORMING COPPER COMPLEXES OF AZO-DYESTUFFS USING NON-SALT-FORMING COPPER (II) COMPOUNDS

BACKGROUND OF THE INVENTION

The present invention relates to a method of forming copper complexes of azo-dyestuffs, and particularly to a method for directly producing a copperized azo-dyestuff composition of predetermined salt content.

It is well-known to produce copper complexes of ortho, ortho'-dihydroxyazo-dyestuffs by reaction of said dyestuffs in aqueous solution with cupric sulfate. This reaction is shown, for example, in U.S. Pat. No. 3,135,730. However, in many instances the resulting solution containing the copperized dyestuff, if dried directly, would yield a dyestuff composition containing more than the desired amount of inorganic salt, i.e. more salt than is utilized in the standard strength, commercial dyestuff composition. The inorganic salt is present due to the sulfate portion of the cupric sulfate which is added and due to the inorganic salts which are carried along in the preparation of the dyestuff being copperized. These latter salts are generally chlorides and/or sulfates of sodium and potassium and are introduced in a variety of ways during the dyestuff preparation, e.g. esterification with sulfuric acid and subsequent pH adjustments with sodium bicarbonate, HCl, etc.

Where the solution of copperized dyestuff contains more than the desired level of inorganic salt, as is often the case, very tedious and inefficient techniques must be employed to separate the copperized dyestuff from some of the extra salt, i.e. to increase the dyestuff/salt ratio. The technique generally employed is to precipitate out the copperized dyestuff by addition of large quantities of salt, generally 20–25% of sodium and/or potassium chloride based on the weight of liquid, filter the precipitate of copperized dyestuff containing a reduced quantity of salt, dry this product, generally by forming an aqueous slurry and sprary drying, then add salt to the final product to bring the salt level in the dyestuff composition to the standard, commercial level.

This technique has a number of disadvantages. The mother liquor from which the dyestuff is precipitated retains up to 15% of the copperized dyestuff which cannot be recovered, thus lowering the dyestuff yield. This mother liquor also presents a waste water problem since it contains both dyestuff and large quantities of salt. Large quantities of salt are consumed in the process since salt is first added to precipitate the dyestuff, then it is added again to make up the standard commercial dyestuff composition. Reaction times are extremely lengthy since salting out and filtration consume from 48 to 96 hours on a commercial run. And extra equipment, namely a filter press and a slurry vat, is required.

SUMMARY OF THE INVENTION

Applicant has discovered a new process for directly producing a standard strength copperized azo-dyestuff composition having a predetermined inert inorganic salt content, thus avoiding the above-described salting out, filtering and drying techniques and the disadvantages associated therewith. Applicant's method utilizes a non-salt-forming copper (II) compound selected from $CuCO_3.Cu(OH)_2$, $2\ CuCO_3.Cu(OH)_2$, $Cu(OH)_2$, $CuO$ and mixtures thereof to react with the water soluble ortho, ortho'-dihydroxyazo-dyestuff. The resulting solution of copperized dyestuff may then be spray dried to obtain the standard strength, commercial dyestuff composition.

DETAILED DESCRIPTION OF THE INVENTION

According to the present invention there is provided a method for directly producing a copperized azo-dyestuff composition having a predetermined inert inorganic salt content which comprises reacting an aqueous solution of a water soluble ortho, ortho'-dihydroxyazo-dyestuff and inorganic salt with one molar equivalent of a non-salt-forming copper (II) compound selected from $CuCO_3.Cu(OH)_2$, $2\ CuCO_3.Cu(OH)_2$, $Cu(OH)_2$, $CuO$ mixtures thereof. The aqueous solution of uncopperized dyestuff and salt should contain an amount of inert inorganic salt equal to or less than the predetermined amount of salt required in the final standard dyestuff composition. Any salt deficiency in the aqueous dyestuff solution may be made up by adding more inorganic salt to the solution before, during or after copperization, or by incorporating some salt-forming copper (II) compound, such as copper sulfate, along with the aforementioned non-salt-forming copper compound to effect copperization. However, the total quantity of copper compounds added should not exceed one molar equivalent based on the dyestuff. The copperization reaction may be conducted at from 10°–80° C., although it is preferred to stay between 30° and 60° C.

The dyestuffs which may be copperized according to the present invention are the water soluble ortho, ortho'-dihydroxyazo-dyestuffs, and reactive equivalents or precursors thereof which are transformed to the dihydroxyazo form either prior to or during copperization. Of particular interest are the dyestuffs of the formula:

wherein:
OR is in the ortho position to the azo group and R is hydrogen or methyl;
$R_1$ is benzene or naphthalene optionally substituted by halo, lower alkyl, lower alkoxy, nitro, acetylamino, sulfo, and combinations thereof;
$R_2$ is selected from:
(a) 1-phenyl-5-hydroxy pyrazole substituted in the 3-position by $CH_3$ or COOH and optionally substituted on the phenyl group by halogen, lower alkyl, sulfo, and combinations thereof;
(b) sulfonaphthalenes having a hydroxy, lower alkoxy or carboxy group ortho to the azo group and optionally substituted by halogen, lower alkyl, amino, acetylamino, chloroacetylamino, benzoylamino, phenylamino, N-phenyl-sulfonyl-N-methylamino, and combinations thereof;
(c) acetoacetylamino benzene sulfonic acid; and
(d) benzene or pyridine substituted by hydroxy in the ortho position to the azo group and optionally substituted by lower alkyl, lower alkoxy, hydroxy, halo, nitro, amino, sulfo and combinations thereof;
A is selected from $—SO_2—CH_2CH_2—OSO_3H$, $—SO_2CH=CH_2$, and $—SO_2CH_2CH_2Cl$;
n is 0 to 4, preferably 1 or 2;
said dyestuff containing at least one water solubilizing group selected from sulfonic acid and carboxylic acid.

After copperization the above dyestuffs will have a copper molecule bonded to the ortho-hydroxy groups as represented by the structure:

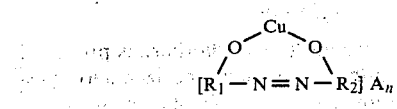

These copperized dyestuffs are sold commercially as a standard strength composition containing from 30–70%, more usually 40–60%, inert inorganic salt depending on the dyestuff. The inorganic salts used to dilute or cut the dyestuff are generally the inexpensive halides and sulfates of alkali metals, most frequently the chlorides and sulfates of sodium and potassium. Most of this salt is carried along with the dyestuff during its synthesis. For example, the reactive group $-SO_2CH_2CH_2OSO_3H$ is prepared by esterification of the corresponding hydroxyethylsulfonyl group with sulfuric acid. After neutralization, the excess sulfuric acid is carried along as sodium sulfate. Other salts may also be introduced into the reaction kettle during preparation. If copper sulfate is used as the copperizing agent, then one molar equivalent of sulfate salt is necessarily carried into the pot.

The inorganic salt introduced by utilizing a salt-forming copper (II) compound, such as copper sulfate, presents a severe problem when the so-increased salt content exceeds the proportion of salt required in the standard strength, commercial dyestuff composition. As mentioned previously, in such a case the dyestuff must be salted out to increase the dyestuff/salt ratio.

The present invention is designed to avoid this problem and is thus applicable where the amount of salt present in the aqueous dyestuff solution prior to copperization is equal to or less than the amount of salt needed in the standard strength commercial composition. Where the proportion of salt present prior to copperization is equal to the amount needed in the standard commercial composition, then copperization is conducted with only non-salt-forming copper (II) compounds. Such compounds are $CuCO_3 \cdot Cu(OH)_2$, $2\ CuCO_3 \cdot Cu(OH)_2$, $Cu(OH)_2$, $CuO$ and mixtures thereof. The first two of these are available as the naturally ocurring minerals malachite and azurite respectively.

Where the proportion of salt present in the uncopperized dyestuff solution is less than that required in the standard strength commercial composition, then a salt-forming copper(II) compound such as $CuSO_4$, $Cu(NO_3)_2$ or $CuCl_2$ may be utilized in conjunction with the non-salt-forming copper compound to make up some or all of the salt deficiency. In no event should the total amount of copper compound added exceed one molar equivalent based on the dyestuff. In general practice one would normally attempt to keep the total salt content within plus or minus 10% of that required in the standard strength commercial composition, then bring the level of salt to standard after drying the copperized product, e.g. by adding salt if too low, or by blending with low salt dyestuff if too high. Of course, additional inorganic salt can be added at any time, whether before, during or after copperization or after drying.

The process of this invention has a number of substantial advantages over the conventional copper sulfate process where salting out and filtering are required. Since no salting out of dyestuff is required under the present process, a substantial savings is realized in the amount of salt consumed in the dyestuff preparation. For example, in a typical commercial run approximately 10,000 pounds of salt are added to the aqueous dyestuff solution to precipitate the dyestuff. All of this salt is lost to the mother liquor and creates a waste water problem in addition to the extra cost for the salt. To make matters worse, salting does not precipitate all of the dyestuff. Up to 15% can be lost to the mother liquor which is a substantial waste water and cost disadvantage. Under the present process, there is no waste water since the copperized dyestuff solution may be spray dried directly to yield the final composition. And there is no loss of dyestuff since all of the product is recovered. Thus, yields are higher. Another significant advantage to the present process is that the total preparation time to obtain the final product is reduced substantially, up to 100 hours in some instances. As a practical matter, this time savings effectively doubles an existing plant's capacity to make copperized dyestuffs. A further advantage to the present process is that less equipment is needed since the filter press and re-slurrying vat used in the conventional technique may be eliminated.

The following comparative example illustrates the invention, the parts and percentages being by weight.

EXAMPLE

In a glass-lined reaction vessel 651 parts of 2-aminophenol-5-β-hydroxyethylsulfone are introduced, while stirring into 1302 parts of concentrated sulfuric acid and stirred until a complete solution is obtained. The sulfuric acid solution is then poured nto 12000 parts of an ice and water mixture contained in a reaction vat and diazotized at 0°–5° C. with 525 parts of a sodium nitrite solution of 40% strength. The excess nitrite is then eliminated by addition of sulfamic acid. The diazo solution is then combined with 5415 parts of a 20% 8-acetylamino-1-hydroxynaphthalene-3,6-disulfonic acid solution while maintaining the pH at 5–7 with sodium hydroxide, and stirred until the coupling is complete. The pH of this solution is then adjusted to 5–5.5 with hydrochloric acid to give an aqueous solution of dyestuff having the formula

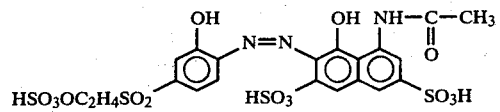

and approximately 50% salt (sodium sulfate/sodium chloride) based on the weight of dyestuff/salt. This solution may then be copperized according to one of the following procedures to yield a standard strength dyestuff composition consisting of 47% copperized dyestuff of the formula

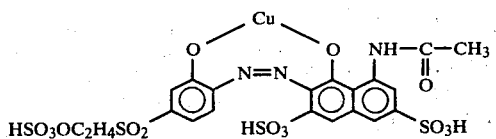

and 53% inert inorganic salt.

TRADITIONAL COPPERIZATION PROCESS

To the pH-adjusted, aqueous solution of dihydroxyazo dyestuff is added 750 parts cupric sulfate and the whole is heated to 50°–55° C. and stirred until copperization is complete. After neutralization, the copperized dyestuff is precipitated by addition of 5150 parts potassium chloride, filtered and washed with saturated salt solution. The filter cake is redissolved in water and spray dried, and the resultant dyestuff composition standardized by blending in approximately 1350 parts salt to give 4500 parts of the desired 47:53 dyestuff:salt blend. The mother liquor from which the dyestuff is precipitated contains about 10–15% dyestuff and large quantities of salt and must be treated biologically.

NEW COPPERIZATION PROCESS

To the pH-adjusted, aqueous solution of dihydroxyazo-dyestuff is added 325 parts of cupric carbonate basic ($CuCO_3 \cdot Cu(OH)_2$) and the whole heated to 50°–55° C. and stirred until copperization is complete. This solution is then spray dried and the resultant dyestuff composition standardized by blending in about 275 parts salt to give 5500 parts of the desired 47:53 dyestuff:salt blend.

| COMPARATIVE RESULTS | | |
|---|---|---|
| | Traditional Process | New Process |
| Yield | 4500 parts | 5500 parts |
| Production Time[1] | 154 hours | 66 hours |
| Salt Consumed[2] | 6500 parts | 275 parts |
| Waste Water | Requires treatment | None |

[1]Actual charged production time - includes charging the reactants, conducting the reaction, transferring materials to various equipment utilized, isolating the product, and clean-up.
[2]Includes only inorganic salts added as such and not those salts formed during the dyestuff preparation and already present in solution prior to copperization.

What is claimed is:

1. A method of directly producing a copperized azo-dyestuff composition of predetermined inert inorganic salt content, wherein the predetermined inert inorganic salt content is within plus or minus 10% of the salt content utilized in a standard strength, commercial composition of said copperized azo-dyestuff, which method comprises reacting
   a water soluble ortho, ortho'-dihydroxyazo-dyestuff, or reactive equivalent thereof, which is dissolved in aqueous solution containing inert inorganic salt, said inorganic salt being present in an amount equal to the predetermined amount or less than the predetermined amount by no more than 0.9 moles of salt per mole dyestuff, with
   about one molar equivalent of a copper (II) compound consisting of from 1.0 to 0.1 molar equivalent of non-salt-forming copper compound selected from $CuCO_3 \cdot Cu(OH)_2$, $2CuCO_3 \cdot Cu(OH)_2$, $Cu(OH)_2$, $CuO$ and mixtures thereof, and correspondingly from 0 to 0.9 molar equivalent of a salt-forming copper (II) compound selected from $CuSO_4$, $CuCl_2$ and $Cu(NO_3)_2$ so as not to increase the inorganic salt content of the aqueous solution beyond the predetermined amount, and
   drying the solution to obtain a copperized dyestuff/salt composition,
   wherein additional, inert inorganic salt is blended with either said dried dyestuff/salt composition or with said aqueous solution of dyestuff and salt prior to drying as needed to increase the total inorganic salt content of the copperized dyestuff composition to the predetermined amount.

2. The method of claim 1 wherein said inert inorganic salt is selected from chlorides and sulfates of sodium and potassium and mixtures thereof.

3. The method of claim 2 wherein the drying is effected by spray drying.

4. The method of claim 3 wherein the ortho, ortho'-dihydroxyazo-dyestuff has the formula:

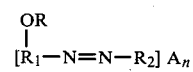

wherein:
OR is in the ortho position to the azo group and R is hydrogen or methyl;
$R_1$ is benzene or naphthalene or benzene or naphthalene substituted by one or more halo, lower alkyl, lower alkoxy, nitro, acetylamino or sulfo;
$R_2$ is selected from:
  (a) 1-phenyl-5-hydroxy pyrazole substituted in the 3-position by $CH_3$ or COOH, and in which the phenyl group is unsubstituted or is substituted by one or more halogen, lower alkyl or sulfo;
  (b) sulfonaphthalenes having a hydroxy, lower alkoxy or carboxy group ortho to the azo group, and being further unsubstituted or substituted by one or more halogen, lower alkyl, amino, acetylamino, chloroacetylamino, benzoylamino, phenylamino or N-phenyl-sulfonyl-N-methylamino;
  (c) acetoacetylamino benzene sulfonic acid; and
  (d) benzene or pyridine substituted by hydroxy in the ortho position to the azo group and further unsubstituted or substituted by one or more lower alkyl, lower alkoxy, hydroxy, halo, nitro, amino or sulfo;
A is selected from $-SO_2-CH_2CH_2-OSO_3H$, $-SO_2CH=CH_2$, and $-SO_2CH_2CH_2Cl$;
n is 1 or 2; said dyestuff containing at least one water solubilizing group selected from sulfonic acid and carboxylic acid.

* * * * *

UNITED STATES PATENT AND TRADEMARK OFFICE
CERTIFICATE OF CORRECTION

PATENT NO. : 4,400,317
DATED : August 23, 1983
INVENTOR(S) : Anthony J. Corso

It is certified that error appears in the above—identified patent and that said Letters Patent is hereby corrected as shown below:

| | |
|---|---|
| Col. 1, line 40 | "sprary" should read "spray" |
| Col. 2, line 14 | insert "and" mixtures thereof |
| Col. 4, line 32 | "nto" should read "into" |

Signed and Sealed this

Twenty-seventh Day of March 1984

[SEAL]

Attest:

GERALD J. MOSSINGHOFF

Attesting Officer     Commissioner of Patents and Trademarks